Oct. 27, 1936.    P. N. MARTIN    2,058,610

POWER LIMITING APPARATUS

Filed July 17, 1934

INVENTOR
Paul N. Martin
BY
HIS ATTORNEY

Patented Oct. 27, 1936

2,058,610

UNITED STATES PATENT OFFICE 2,058,610

POWER LIMITING APPARATUS

Paul N. Martin, Swissvale, Pa., assignor to The Union Switch & Signal Company, Swissvale, Pa., a corporation of Pennsylvania Application July 17, 1934, Serial No. 735,597

12 Claims. (Cl. 246—41)

My invention relates to power limiting apparatus, that is, to apparatus for limiting the amount of power supplied from a source of electric current to a load. Apparatus embodying my invention is particularly well adapted for, though in no way limited to, railway signaling track circuits, and when so used it provides novel and improved means for insuring the release of a track relay when a car or train enters the associated section of track.

I will describe four forms of apparatus embodying my invention, and will then point out the novel features thereof in claims.

Figure 1:
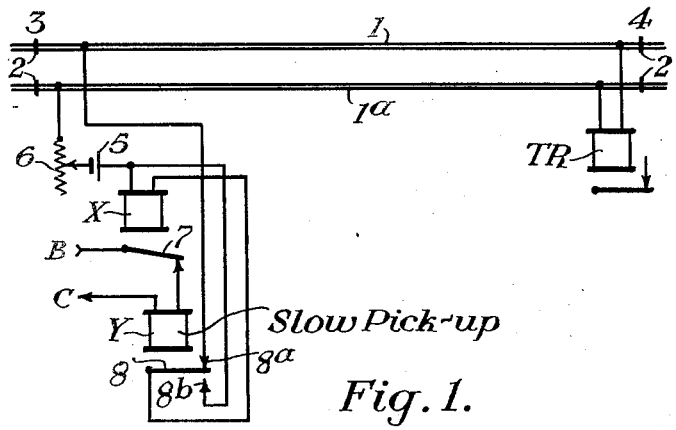
Figure 2:
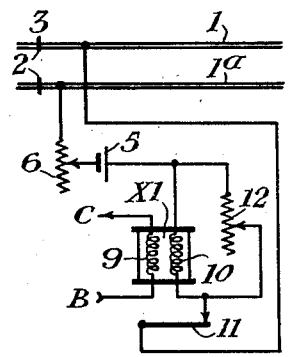
Figure 3:
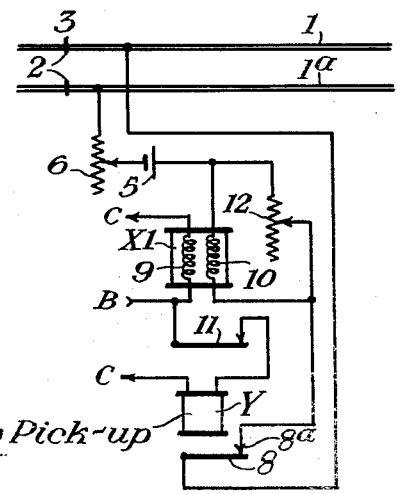
Figure 4:
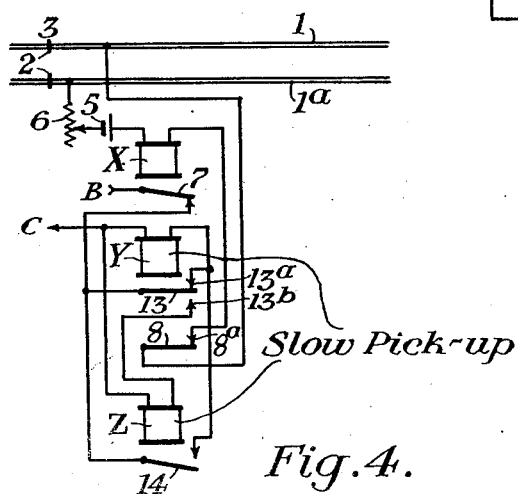

In the accompanying drawing, Fig. 1 is a diagrammatic view showing one form of apparatus embodying my invention. Figs. 2, 3 and 4 are diagrammatic views showing modifications of the apparatus shown in Fig. 1 and also embodying my invention.

Similar reference characters refer to similar parts in each of the views.

Referring first to Fig. 1, the reference characters 1 and 1a designate the track rails of a stretch of railway track, which rails are divided by insulated joints 2 to form a track section 3—4. A track relay TR is connected across the rails at one end of this section. Located at the other end of the section is a source of track circuit current 5, which, as here shown, is a battery. This battery is connected across the rails 1 and 1a through a current-limiting impedance 6, the winding of a relay X, and a front contact 8—8a of a relay Y. The relay Y is of the slow pickup type, but has normal release characteristics. Relay Y is provided with a circuit which includes a source of current and a back contact 7 of relay X. Relay X is provided with a short circuiting or snubbing path which includes back contact 8—8b of relay Y.

The parts are so adjusted that when the section 3—4 is unoccupied, the current which flows through the winding of relay X is not sufficient to open back contact 7, and so relay Y is then energized to complete the connection of battery 5 to the track rails. When a car or train enters section 3—4, however, the increased current which flows through the winding of relay X is sufficient to effectively energize this relay, thereby opening contact 7 and deenergizing relay Y. The consequent opening of front contact 8—8a of relay Y will disconnect battery 5 and relay X from track rail 1, and the closing of back contact 8—8b will complete the snubbing path around relay X, so that after a short time interval relay X will again release to close its back contact 7. Then after the interval of time determined by the pickup characteristic of relay Y, front contact 8—8a will again close to energize relay X. This operation will be repeated as long as the car or train occupies any part of section 3—4. The result is that while the section is occupied, battery 5 is periodically disconnected from the track rails, and the periods of disconnection will be much longer than the periods of connection. It follows that the track relay will release with a higher train shunt resistance and in less time than for an ordinary track circuit without relays X and Y, and will be less likely to pick up again while the section is occupied.

The reason for the snubbing path around relay X is to delay the release of this relay for a sufficient time to insure that the magnetic flux in relay Y shall completely collapse before energy is again applied to Y. This improves the uniformity of operation of the relays, and also increases the ratio between the off and on times of battery 5.

Referring now to Fig. 2, the auxiliary relay, which is here designated XI, comprises two opposing windings 9 and 10. Winding 9 is constantly energized from a source of current the terminals of which are designated B and C. Track battery 5 is connected across the track rails through a current-limiting impedance 6, winding 10, and front contact 11 of relay XI. The parts are so adjusted that normally the effect of winding 9 predominates over the effect of winding 10 to a sufficient extent to cause front contact 11 to be closed. When a car or train enters section 3—4, however, the increased current which flows through winding 10 will cause the effects of the two windings to neutralize to a sufficient extent to release contact 11. Battery 5 will then be disconnected from rail 1, and contact 11 will again close due to the absence of current in winding 10, whereupon battery 5 will again be connected with rail 1. This process will be repeated continuously as long as any part of the car or train occupies the section.

Winding 9 may be energized from battery 5, if desired, in which case the current through this winding will vary slightly in such manner as to tend to compensate for changes in the voltage of this battery.

A variable resistance 12 may be connected in multiple with winding 10 to facilitate adjusting the characteristics of relay XI.

The apparatus shown in Fig. 3, is the same as that shown in Fig. 2, except for the provision of a slow pickup relay Y which operates in the same manner as the corresponding relay in Fig. 1 to prolong the periods during which battery 5 is disconnected from the track rails. In Fig. 3 battery 5 is connected across the rails through impedance 6, winding 10 and front contact 8—8ª of relay Y. The circuit for relay Y includes front contact 11 of relay X1. The operation of the apparatus shown in Fig. 3 will be obvious from the foregoing explanation of the operation of Figs. 1 and 2.

Referring now to Fig. 4, the apparatus shown in this view is similar to that which is shown in Fig. 1, except that the snubbing path around relay X is omitted, and a second slow pickup relay Z has been added to provide for a still longer off period of battery 5. In Fig. 4, the battery 5 is connected across the track rails through the winding of relay X and front contact 8—8ª of relay Y, as in Fig. 1. Relay Y is provided with a closing circuit which passes from terminal B, through back contact 7 of relay X, front contact 14 of relay Z, and the winding of relay Y to terminal C. Relay Y is provided with a holding circuit which passes from terminal B, through back contact 7, front contact 13—13ª of relay Y, and the winding of relay Y to terminal C. Relay Z is provided with a circuit which passes from terminal B, through back contact 7, back contact 13—13ᵇ of relay Y, and the winding of relay Z to terminal C.

Normally the parts of the apparatus shown in Fig. 4 are in the conditions in which they are shown in the drawing. When a train enters the track section, however, relay X becomes effectively energized because of the increased current drawn from battery 5. The opening of back contact 7 of relay X opens the holding circuit for relay Y, so that this relay becomes deenergized thereby disconnecting battery 5 and relay X from the track rail 1. Back contact 7 then closes, thereby closing the circuit for relay Z through this contact and back contact 13—13ᵇ of relay Y. After a given interval of time contact 14 of relay Z will close, thereby completing the closing circuit for relay Y. After another fixed interval of time the front contacts of relay Y will close, thereby opening the circuit for relay Z at back contact 13—13ᵇ and closing the holding circuit for relay Y at front contact 13—13ª. Front contact 8—8ª will, of course, reconnect battery 5 and relay X across the track rails, and the operation of the apparatus will then start again. It will be seen, therefore, that the lengths of the periods during which battery 5 is disconnected from the track circuit will be longer than with the apparatus shown in Fig. 1.

The present application is closely related to the copending application for Railway track circuit apparatus, Serial No. 705,558, filed by L. O. Grondahl on January 6, 1934, which latter application contains claims which cover broadly certain features of the invention disclosed in my present application.

Although I have herein shown and described only a few forms of apparatus embodying my invention, it is understood that various changes and modifications may be made therein within the scope of the appended claims without departing from the spirit and scope of my invention.

Having thus described my invention, what I claim is:

1. In combination, a section of railway track, a source of current connected across the rails of said section through the winding of a first relay and a front contact of a slow pickup relay, and a circuit for said slow pickup relay including a contact of said first relay, the parts being so adjusted that the first relay is effectively energized when said section is occupied but not when it is unoccupied.

2. In combination, a section of railway track, a source of current connected across the rails of said section through the winding of a first relay and a front contact of a slow pickup relay, a circuit for said slow pickup relay including a back contact of said first relay, and a snubbing path around the winding of said first relay including a back contact of said slow pickup relay, the parts being so adjusted that the first relay is effectively energized when said section is occupied but not when it is unoccupied.

3. In combination, a section of railway track, a relay having two opposed operating windings, means for constantly energizing one of said windings, a slow pickup relay, a source of track circuit current connected across the rails of said section through the second winding of said first relay and a front contact of said second relay, and a circuit for said second relay including a front contact of said first relay, the parts being so adjusted that the front contact of said first relay is normally closed but opens due to the increase of current in said second winding when said section becomes occupied.

4. In combination, a section of railway track, a relay having two opposed operating windings, means for constantly energizing one of said windings, a source of track circuit current connected across the rails of said section through the other of said windings, said relay including a contact which is normally closed but which opens due to the increase of current in said second winding when said section becomes occupied, and means for opening the connection of said source with one of the track rails when said contact is open.

5. In combination, a section of railway track, a relay having two opposed operating windings, means for constantly energizing one of said windings, a source of current connected across the rails of said section through the other of said windings, and means controlled by the increase of current in said second winding when said section becomes occupied for interrupting the connection of said source with a rail of said track.

6. In combination, a section of railway track, a relay having two opposed operating windings, means for constantly energizing one of said windings, a source of current connected across the rails of said section through the other of said windings, means controlled by the increase of current in said second winding when said section becomes occupied for interrupting the connection of said source with a rail of said track, and an adjustable resistance connected in multiple with said second winding.

7. In combination, a section of railway track, a source of current connected across the rails of said section through the winding of a first relay and a front contact of a slow pickup relay, a second slow pickup relay, a closing circuit for said first slow pickup relay including a back contact of said first relay and a front contact of said second pickup relay, a holding circuit for said first slow pickup relay including a back contact of said first relay and a front contact of said first pickup relay, and a circuit for said second slow pickup relay including a back contact of said first relay and a back contact of said first slow pickup relay, the parts being so adjusted that the first relay is effectively energized when said section is occupied but not when it is unoccupied.

8. In combination, a load, a relay having two opposed operating windings, means for constantly energizing one of said windings, a slow pickup relay, a source of current connected with said load through the second winding of said first relay and a front contact of said second relay, and a circuit for said second relay including a front contact of said first relay, the parts being so adjusted that the front contact of said first relay is normally closed but opens upon a given increase in current drawn from said source by said load.

9. In combination, a section of railway track, a source of track circuit current connected across the rails of said section, a series relay having a winding included in the connection of said source with one of the rails, said relay normally assuming one condition when said section is unoccupied and the current in said winding is relatively low and another condition when the section becomes occupied by a train and the current in said winding is increased, a normally energized slow acting relay controlled by said series relay in accordance with the condition thereof, and means controlled by said slow acting relay and effective when said series relay assumes said other condition and said section is occupied for varying the amount of current supplied from said source to said section.

10. In combination, a section of railway track, a source of track circuit current connected across the rails of said section, a series relay having a winding included in the connection of said source with one of the rails, said relay normally assuming one condition when said section is unoccupied and the current in said winding is relatively low and another condition when the section becomes occupied by a train and the current in said winding is increased, a slow acting relay controlled by said series relay in accordance with the condition thereof, and means controlled by said slow acting relay and effective when said series relay assumes said other condition for interrupting the current supplied from said source to said section.

11. In combination, a load, a source of current connected with said load, a first relay in circuit with said load and responsive to the amount of current taken by said load, a slow acting relay controlled by said first relay in such manner as to become operated when the amount of current received by said load exceeds a given value, and means controlled by said slow acting relay in its operated condition for interrupting the connection of said source with said load.

12. In combination, a load, a source of current connected across said load through a normally closed circuit including the winding of a first normally deenergized relay, a normally energized slow pickup relay, a circuit for said slow pickup relay including a contact of said first relay, and means effective when said slow pickup relay is deenergized for interrupting said normally closed circuit to thereby interrupt the supply of current from said source to said load.

PAUL N. MARTIN.